United States Patent [19]

Nortier et al.

[11] Patent Number: 4,766,101

[45] Date of Patent: Aug. 23, 1988

[54] ALUMINA-BASED CATALYST CARRIERS HAVING IMPROVED DURABILITY/MECHANICAL STRENGTH/AGING RESISTANCE

[75] Inventors: Patrice Nortier, Romainville; Thierry Dupin, Garges-Les-Gonesse; Bertrand Latourrette, Le Raincy, all of France

[73] Assignee: Rhone-Poulenc Specialites Chimiques, Courbevoie, France

[21] Appl. No.: 804,641

[22] Filed: Dec. 4, 1985

[30] Foreign Application Priority Data

Dec. 5, 1984 [FR] France ................................ 8418507

[51] Int. Cl.$^4$ ........................ B01J 21/04; B01J 21/08; B01J 31/18; B01J 32/00

[52] U.S. Cl. .................................. 502/164; 502/242; 502/250; 502/263; 502/439

[58] Field of Search ............... 502/164, 242, 243, 263, 502/439, 250

[56] References Cited

U.S. PATENT DOCUMENTS

| | | | |
|---|---|---|---|
| 3,239,521 | 3/1966 | Weldes | 260/247.7 |
| 4,013,590 | 3/1977 | Buonomo et al. | 252/455 R |
| 4,061,594 | 12/1977 | Michel et al. | 252/462 |
| 4,228,088 | 10/1980 | Kuiper | 502/164 X |
| 4,290,913 | 9/1981 | Frame | 502/164 X |
| 4,339,545 | 7/1982 | Knifton | 502/164 X |
| 4,430,442 | 2/1984 | Sawyer et al. | 502/164 X |
| 4,430,443 | 2/1984 | Seiver et al. | 502/164 X |
| 4,473,663 | 9/1984 | Patton et al. | 502/164 X |
| 4,484,002 | 11/1984 | Lin | 502/164 X |
| 4,518,703 | 5/1985 | Young | 502/242 X |

FOREIGN PATENT DOCUMENTS

| | | | |
|---|---|---|---|
| 0108486 | 10/1982 | European Pat. Off. | 502/263 |
| 0146524 | 12/1983 | European Pat. Off. | 502/263 |
| 1524886 | 9/1978 | United Kingdom . | |

OTHER PUBLICATIONS

Derwent Japanese Patent Report, vol. 75 No. 33, section H, Londres, GB; & JP-A-75 023 391 (Nissan Chemical Inds., Co., Ltd.) 8/7/75.

*Primary Examiner*—W. J. Shine
*Attorney, Agent, or Firm*—Burns, Doane, Swecker & Mathis

[57] ABSTRACT

Durable, aging-resistant alumina-based catalyst carriers having improved mechanical strength are facilely prepared by (i) impregnating an alumina-based catalyst carrier with an aqueous solution of a quaternary ammonium silicate, (ii) drying said impregnated carrier, and (iii) calcining said dried carrier.

18 Claims, 1 Drawing Sheet

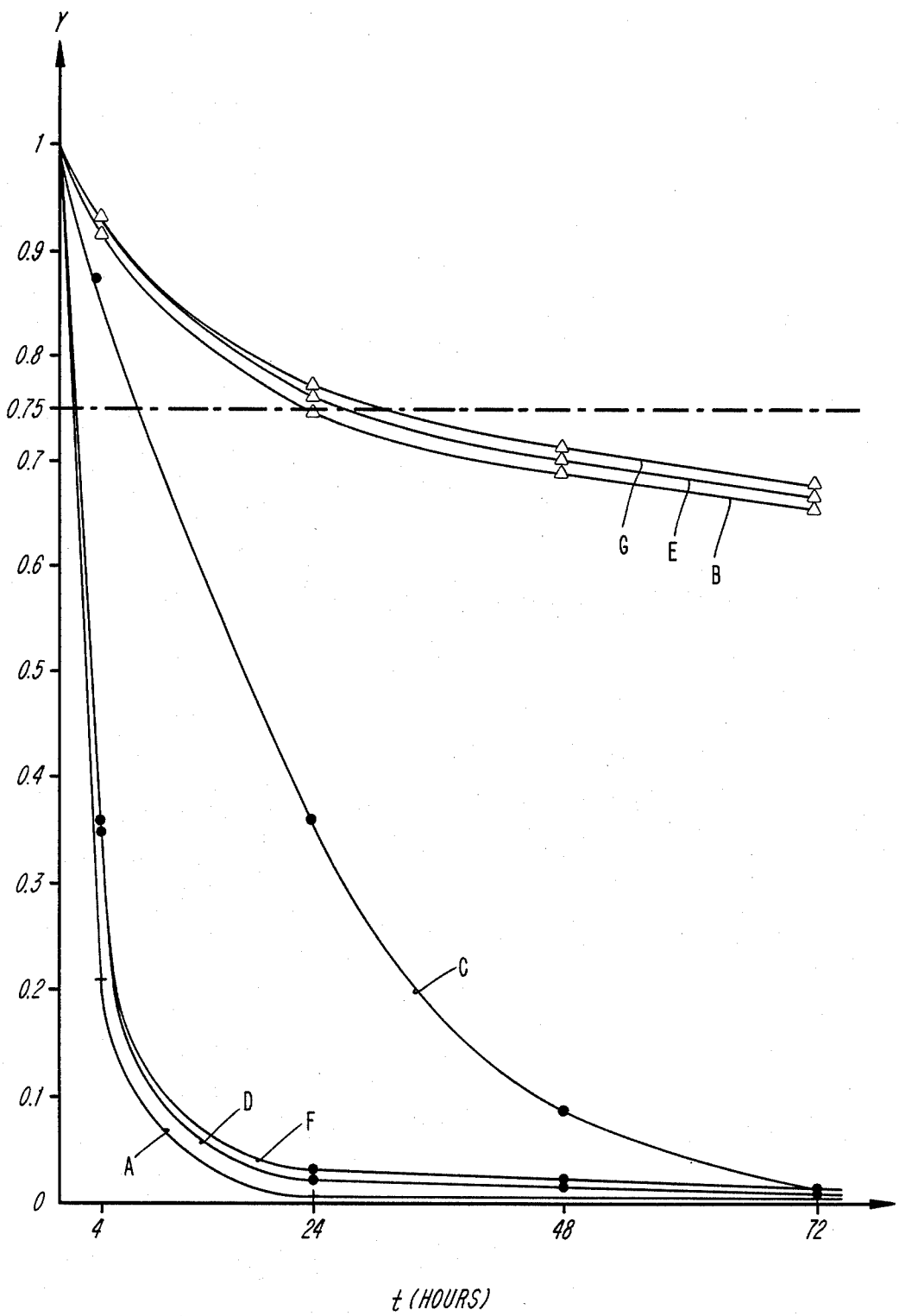

ALUMINA-BASED CATALYST CARRIERS HAVING IMPROVED DURABILITY/MECHANICAL STRENGTH/AGING RESISTANCE

BACKGROUND OF THE INVENTION

1. Field of the Invention

The present invention relates to the production of alumina-based catalyst carriers (supports) having improved durability, and, more especially, to the production of such alumina-based carriers, or supports, in the form of alumina agglomerates.

2. Description of the Prior Art

It is well known to this art that, for numerous applications, such as the treatment of exhaust gases emanating from internal combustion engines, the hydrotreatment of petroleum products, dehydrohalogenation, hydrocracking, hydrogenation, dehydrogenation, dehydrocyclization of hydrocarbons or other organic compounds, oxidation reactions and reduction reactions, catalysts are used, the carrier therefor being alumina-based.

It is also well known to this art that the efficiency of a catalyst is generally the greater, the larger the contact area between the catalyst and the reactants. To achieve this, it is necessary that the catalyst should be maintained in as finely divided a state as possible, that is to say, the solid particles comprising same should be as small and individualized as possible. The fundamental role of the carrier, hence, is to maintain the catalyst particles or crystallites in contact with the reactants, in as finely divided a state as possible.

Of course, part of the concept of a carrier is that the latter must be able to physically maintain the catalyst crystallites in position in the reactor where the chemical reaction takes place, and it is for this reason that the carrier must have a mechanical strength appropriate to the selected application.

The quality of a catalyst carrier is thus firstly linked to its specific surface area (SBE), which can be determined by the BET method and, secondly, to its mechanical strength (EGG), which can be determined by measuring the force required to crush a carrier particle.

Nevertheless, this characterization is inadequate because it is important to the user not only that the fresh catalyst should be very active and firm, but that it should remain so for as long a period of time as possible, such as to reduce the costs involved in replacing the catalyst bed.

It will thus be seen that it is necessary to take into account a durability criterion when evaluating a catalyst carrier.

Given the role of the carrier in heterogeneous catalysis, the durability of a carrier can be defined as the ability to retain a high surface area in the reactor in which it is employed, after a certain period of exposure to the thermal and mechanical conditions prevailing in the reactor.

Indeed, two superposed factors are involved in the aging of a catalyst carrier:

First, irreversible phase changes can occur, especially under the influence of high temperatures, causing sintering, namely, a reduction in the specific surface area due to the coalescence of the very fine micropores. During this coalescence, a portion of the catalyst is engulfed in the carrier mass and is no longer in contact with the reactants; and Second, and this phenomenon is particularly accentuated in the case of bubbling beds or fluidized beds and also in automobile post-combustion treatment, the impacts between the agglomerates can result in a surface abrasion which produces fine particles which can be entrained in the stream of reactants. Thus, this contributes to a reduction in catalyst activity due to a loss of catalyst in the reactor.

SUMMARY OF THE INVENTION

Accordingly, a major object of the present invention is the provision of improved technique for the production of alumina-based catalyst carriers (supports), as well as provision of improved such catalyst carriers, per se, the durability, e.g., resistance to aging thereof, being significantly enhanced vis-a-vis their prior art counterparts.

It is well known to those skilled in this art that alumina, especially in its so-called "transition alumina" forms, and more especially in its so-called $\gamma$ (gamma) and $\delta$ (delta) forms, is an excellent catalyst carrier. A method for preparing alumina agglomerates useful as catalysts or catalyst carriers is described in European Pat. No. 55,164, assigned to the assignee hereof.

It has also been proposed to add various compounds, intended to improve its aging properties, to alumina. Thus, it is known to add:

(i) a rare earth oxide, for example, as described in French Pat. No. 2,257,335;

(ii) an alkaline earth oxide, for example, as described in French Pat. Nos. 2,271,160 and 2,140,575;

(iii) zirconium oxide, for example, as described in French Pat. No. 2,344,361;

(iv) boron oxide, for example, as described in U.S. Pat. No. 2,422,884; and (v) silica, obtained by impregnating the agglomerate with an organic tetraester of silicic acid, such as the compound $(C_2H_5O)_4Si$, dissolved in a non-aqueous solvent, followed by hydrolysis and calcination, for example, as described in French Pat. No. 2,249,852.

The stabilized carriers obtained via the aforesaid techniques undoubtedly have improved durability compared to pure alumina, but this durability is much lower than that achieved according to the present invention.

Briefly, it has now unexpectedly been found that the durability of the alumina-based carriers can be surprisingly improved and to an exceptional degree, by stabilizing them by impregnation with an aqueous solution containing the element silicon essentially in the form of the silicate ion and the element nitrogen in the form of a quaternary ammonium ion, and then drying and activating the impregnated carriers by a calcination which decomposes the organic cation into volatile compounds which diffuse out of the carrier.

BRIEF DESCRIPTION OF THE DRAWING

The FIGURE is a graph depicting the durability of the agglomerate as a function of calcination time.

DETAILED DESCRIPTION OF THE INVENTION

More particularly according to the present invention, the subject process for the production of alumina-based catalyst carriers features, in a first stage, impregnating said carriers with an aqueous solution of a quaternary ammonium srlicate. In a second stage, the impregnated carriers are dried and, in a third stage, said carriers are calcined.

Without wishing to be bound to any particular theory, it is reasoned that the particular structure of the compound containing the element silicon, which compound is advantageously a complex anion, for example, the anion $(Si_6O_{15})^{6-}$ tetraethylammonium silicate, or the anion $(Si_8O_{20})^{8-}$ in tetramethylammonium silicate, gives rise to a reaction with the alumina, with the product of the reaction imparting exceptional durability to the agglomerates by increasing both their resistance to sintering and their resistance to abrasion.

The alumina-based catalyst carriers according to the invention are preferably in the form of particles such as spheres, pellets, extrudates, crushed material, and the like.

According to the invention, by "alumina-based carrier" there is intended a carrier containing at least 55% by weight of alumina.

In the first stage of the process of the invention, the alumina-based carrier is impregnated with an aqueous solution of a quaternary ammonium silicate.

The quaternary ammonium ion of the silicates employed according to the invention advantageously bears hydrocarbon radicals which preferably contain from 1 to 3 carbon atoms. Preferred is at least one silicate selected from among tetramethylammonium silicate, tetraethylammonium silicate, tetrapropylammonium silicate and tetrahydroxyethylammonium silicate (or tetraethanolammonium silicate). Tetramethylammonium silicate is, in particular, described in Y. U. I. Smolin "Structure of water soluble silicates with complex cations" in *Soluble Silicates*, 1982 edition. Tetraethanolammonium silicate is in particular described in Helmut H. Weldes and K. Robert Lange "Properties of soluble silicates" in *Industrial and Engineering Chemistry*, Volume 61, No. 4 (April 1969) and in U.S. Pat. No. 3,239,521. The references cited above also describe other water-soluble quaternary ammonium silicates which are within the ambit of this invention.

In a preferred embodiment of the invention, the quaternary ammonium silicates have the following general formula:

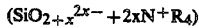

$$(SiO_{2+x}^{2x-} + 2xN^+R_4)$$

and have a ratio r=number of moles of Si/number of moles of N, which is less than 15. This ratio is more particularly preferred to be less than 2 and more specifically ranges from 0.1 to 1.5. Also without wishing to be bound to any particular theory, it too is reasoned that the higher the ratio r, the higher the molecular weight of the silicate ion and hence the higher its hydrodynamic ratio. Thus, above a certain value of the ratio r, which may be about 15, the silicate can no longer penetrate into the fine micropores and this restricts its reaction with the carrier and hence its effectiveness for the purposes of the invention.

According to this invention, an amount of quaternary ammonium silicate is used such that the amount of silica introduced into the carrier ranges from 0.1 to 25% and preferably from 1 to 5% by weight of silica relative to the final product carrier.

Also according to this invention, the impregnation of the carrier is preferably carried out "dry", namely, such that the total volume of solution used is approximately equal to the total pore volume which the carrier possesses.

In one embodiment of the process of the invention, it is envisaged to introduce into the carrier, either before, after or simultaneously with the quaternary ammonium silicate, at least one precursor of rare earth oxides, alkaline earth metal oxides and/or zirconium oxide, which precursor gives rise to, through thermal decomposition, to the corresponding oxides in the finished carrier. The amount of these precursors introduced is such that it corresponds to an amount of from 0 to 20%, preferably from 1 to 10%, and more preferably from 2 to 5%, of oxide of the metal or metals relative to the finished carrier.

In the second stage of the process according to the invention, the impregnated carrier is dried to remove the water, thus leaving the compounds used in the form of the precursors of the desired oxides, uniformly dispersed throughout the alumina. This drying is advantageously carried out at a temperature ranging from 80° to 500° C.

In the third stage of the process of the invention, the dry carrier is calcined at a temperature which typically ranges from 500° to 1,000° C. and preferably from 600° to 900° C. for a sufficient length of time, generally 1 to 24 hours, to calcine the alumina and convert the precursors to their respective oxides. Thus, the quaternary ammonium silicates are converted to silica and the optional rare earth, alkaline earth metal and zirconium precursors are converted to their corresponding oxides.

The carriers obtained according to the invention have considerably improved durability compared to those obtained utilizing conventional prior art techniques. Moreover, the process of the invention has the following advantages:

The silica can be introduced by impregnating the already molded carrier, making it possible to vary the amount of silica introduced into the carrier without altering the molding process. It is also possible, though less interesting, to introduce the silica precursors according to the invention into the carrier mass before it is molded.

Since the silica precursor according to the invention is used in aqueous solution, the process is simple and inexpensive.

The organic cation can easily be removed by calcination even at a temperature below 600° C. Consequently, no compound remains which might interfere with the manufacture, use and performance of the catalyst deposited upon the carrier manufactured according to the invention.

In order to further illustrate the present invention and the advantages thereof, the following specific examples are given, it being understood that same are intended only as illustrative and in nowise limitative.

EXAMPLE 1

Preparation of a reference carrier (A)

A sample of 100 grams of alumina beads marketed by ne-Poulenc under the trademark SCM 129X and having the following properties:

(i) BET specific surface area : 160 $m^2g^{-1}$
(ii) Total pore volume : 0.90 $cm^3g^{-1}$ was calcined at a temperature of 600° C. for 1 hour to adjust the specific surface area thereof to 110±5 $m^2g^{-1}$.

The reference carrier thus prepared is hereinafter referred to as (A).

EXAMPLE 2

Preparation of carriers (C), (D) and (F) according to the prior art

A sample of 100 grams of alumina beads identical to that of Example 1 was impregnated dry with 90 cm$^3$ of a solution of the tetraethyl ester of orthosilicic acid (a product known more commonly as ethyl silicate) in ethanol, the solution containing 15.6 g of the element silicon per liter. This impregnated carrier was then dried at 120° C. for 3 hours and thereafter calcined at 700° C. to adjust its specific surface area to 110±5 m$^2$g$^{-1}$.

Carrier (C) according to the prior art, thus prepared, contained 2% by weight of SiO$_2$ relative to the carrier.

A sample of 400 grams of alumina beads identical to that of Example 1 was divided into two fractions (D) and (F), each of 200 g. The 200 grams of fraction (D) were impregnated dry with 180 cm$^3$ of an aqueous solution of lanthanum nitrate and neodymium nitrate containing 15.8 g of the element lanthanum and 5.29 g of the element neodymium per liter of solution. The 200 grams of fraction (F) were impregnated dry with 180 cm$^3$ of an aqueous solution of zirconyl nitrate containing 16.45 g of the element zirconium per liter of solution. These two fractions were dried for 3 hours at 120° C. and calcined for 1 hour at 600° C.

There were thus obtained, respectively, a carrier (D) 1 according to the prior art, containing 2% of lanthanum oxide and neodymium oxide relative to the carrier, and a carrier (F) according to the prior art, containing 2% of zirconium oxide relative to the carrier.

EXAMPLE 3

Preparation of carriers (B), (E) and (G) according to the invention 100 grams of alumina beads of Example 1 were impregnated dry with 90 cm$^3$ of an aqueous tetraethylammonium silicate solution having a molar ratio SiO$_2$/(C$_2$H$_5$)$_4$N$^+$ equal to 1 and containing 10.4 g of the element silicon per liter of solution. This impregnated carrier was then dried at 120° C. for 3 hours and thereafter calcined for 1 hour at 700° C. to adjust its specific surface area to 110±5 m$^2$g$^{-1}$. The carrier (B) according to the invention, thus prepared, contained 2% by weight of silica relative to the alumina.

100 grams of the carrier (D) obtained in Example 2 were impregnated and treated in the same manner as described above for the preparation of the carrier (B). This gave a carrier (E) according to the invention which contained 2% of (La$_2$O$_3$+Nd$_2$O$_3$) and 2% relative to the carrier.

100 grams of the carrier (F) obtained in Example 2 were impregnated and treated in the same manner as that described above for the preparation of the carrier (B). This gave a carrier (G) according to the invention which contained 2% of ZrO$_2$ and 2% of SiO$_2$ relative to the carrier.

EXAMPLE 4

Durability test 100 grams of the carrier (A) were divided into 5 fractions of 20 grams, referenced A0, A1, A2, A3 and A4, which were respectively subjected to the following measures and/or treatments:

A0: measurement of the specific surface area SBE 0 according to the BET method at one point and measurement of the attrition AIF 0 according to the following method:

- the beads were calcined for 2 hours at 300° C.;
- the beads were sieved on a sieve corresponding to their lower nominal dimension (for example, if 1.6/2.5 mm beads were involved, a 1.6 mm sieve was used);
- 10 g of beads were placed in an impact apparatus marketed by PROLABO under the trademark DANGOUMAU microgrinder, and the apparatus was operated for 30 minutes;
- the residual beads were sieved on a sieve corresponding to $\frac{3}{4}$ of the lower size of the starting beads (for example, $1.6 \times \frac{3}{4} = 1.2$ mm; a 1.25 mm sieve was used because this was the closest AFNOR (French Standards) sieve; and
- the beads which remained were calcined for 2 hours at 300° C. and then weighed.

The attrition resistance is given by the equation:

$$\% AIF = \frac{P2}{P1} \times 100$$

P$_2$=weight of carrier employed and P$_1$=weight of catalyst rejected by the sieve after the test.

A1: Calcination for 4 hours at 1,100° C. followed by measurement of the specific surface area SBE 1 by the BET method at 1 point.

A2: Calcination for 24 hours at 1,100° C., the remainder of the treatment being identical to that described in A1.

A3: Calcination for 48 hours at 1,100° C., the remainder of the treatment being identical to that described in A1.

A4: Calcination for 72 hours at 1,100° C., the remainder of the treatment being identical to that described in A1.

The following measurements were carried out:
  on A1: SBE 1 and AIF 1
  on A2: SBE 2 and AIF 2
  on A3: SBE 3 and AIF 3
  on A4: SBE 4 and AIF 4.

For each duration of calcination $t_i$ there was then calculated, as a function of the residual initial surface area of the carrier after calcination and attrition:

$$y_i = \frac{SBEi \times AIFi}{SBE\phi} \text{ for } i = 1, 2, 3 \text{ and } 4.$$

The points representing the pairs $(t_i, y_i)$ for $i = 1, 2, 3$ and 4, as well as the point $(0,1)$ representing the initial state of the carrier were then plotted on a right-angled grid.

The curve joining these points was drawn and the abscissa of its intersection with the straight line of the equation $y = 0.75$ was the durability.

Thus, the durability represents the duration of heat treatment which reduced to three-quarters the surface area remaining after the heat treatment and mechanical treatment.

EXAMPLE 5

The test set forth in Example 4 was repeated for the fractions (B), (C), (D), (E), (F) and (G).

The following results were obtained:

| FRACTION REFERENCE | DURABILITY (hours) |
|---|---|---|
| PRIOR ART | (A) | 1.3 |
| INVENTION | (B) | 24 |
| PRIOR ART | (C) | 8 |
| PRIOR ART | (D) | 1.5 |
| INVENTION | (E) | 28 |
| PRIOR ART | (F) | 1.5 |
| INVENTION | (G) | 32 |

The results were plotted on the curves in the attached FIGURE of Drawing. In this FIGURE, the various points represent:
+ unstabilized carrier,
· prior art carrier,
Δ carrier according to the invention.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a durable, aging-resistant alumina-based catalyst carrier having improved mechanical strength, comprising (i) impregnating an agglomerated alumina-based catalyst carrier with an aqueous solution of a quaternary ammonium silicate of general formula:

$$(SiO_{2+x}^{2x-} + 2 \times N^+ R_4)$$

wherein R is a hydrocarbon radical and in which the ratio r, the number of moles of Si/number of moles of N, is less than 15, (ii) drying said impregnated carrier, and (iii) calcining said dried carrier.

2. The process as defined by claim 1, said catalyst carrier impregnated comprising alumina particulates.

3. The process as defined by claim 2, said alumina particulates comprising spheres, pellets, extrudates or crushed alumina.

4. The process as defined by claim 3, said catalyst carrier impregnated comprising finely divided alumina.

5. The process as defined by claim 4, said catalyst carrier impregnated comprising transition alumina agglomerates.

6. The process as defined by claim 2, wherein said silicate is converted into silica during the calcination step (iii).

7. The process as defined by claim 6, said quaternary ammonium silicate comprising tetramethylammonium, tetraethylammonium, tetrapropylammonium or tetrahydroxyethylammonium silicate.

8. The process as defined by claim 6, wherein the final product catalyst carrier comprises from 0.1 to 25% by weight of silica.

9. The process as defined by claim 8, wherein the final product catalyst carrier comprises from 1 to 5% by weight of silica.

10. The process as defined by claim 1, said impregnating step (i) being on a dry basis.

11. The process as defined by claim 1, wherein said ratio r ranges from 0.1 to 1.5.

12. The process as defined by claim 1, further comprising introducing into said catalyst carrier, prior to the drying (ii) thereof, at least one precursor of a rare earth, alkaline earth and/or zirconium oxide.

13. The defined by claim 12, said least one precursor being thermally decomposed into respective oxide form thereof during said calcination step (iii).

14. The process as defined by claim 13, said at least one oxide form comprising up to 20% by weight of the final product catalyst carrier.

15. The process as defined by claim 14, said at least one oxide form comprising from 1 to 10% by weight of the final product catalyst carrier.

16. The process as defined by claim 14, said at least one oxide form comprising from 2 to 5% by weight of the final product catalyst carrier.

17. The process as defined by claim 1, comprising carrying out said drying step (ii) at a temperature of from 80° to 500° C.

18. The process as defined by claim 17, comprising carrying out said calcining step (iii) at a temperature of from 500° to 1,000° C. for from 1 to 24 hours.

* * * * *